(12) United States Patent
Mikel et al.

(10) Patent No.: US 7,281,128 B2
(45) Date of Patent: Oct. 9, 2007

(54) ONE PASS SECURITY

(75) Inventors: Dean Mikel, Boise, ID (US); Mark Wilkins, Boise, ID (US)

(73) Assignee: Extended Systems, Inc., Boise, ID (US)

( * ) Notice: Subject to any disclaimer, the term of this patent is extended or adjusted under 35 U.S.C. 154(b) by 719 days.

(21) Appl. No.: 10/096,784

(22) Filed: Mar. 12, 2002

(65) Prior Publication Data

US 2003/0079143 A1    Apr. 24, 2003

Related U.S. Application Data

(60) Provisional application No. 60/353,354, filed on Oct. 22, 2001.

(51) Int. Cl.
*H04L 9/32* (2006.01)
*G06F 7/04* (2006.01)
*H04L 9/00* (2006.01)

(52) U.S. Cl. ............... 713/155; 713/168; 713/171; 726/8; 380/30

(58) Field of Classification Search ........... 713/155, 713/168, 171; 726/8; 380/30
See application file for complete search history.

(56) References Cited

U.S. PATENT DOCUMENTS

| | | | | | |
|---|---|---|---|---|---|
| 4,578,530 | A | * | 3/1986 | Zeidler | 705/71 |
| 5,182,770 | A | * | 1/1993 | Medveczky et al. | 705/56 |
| 5,825,890 | A | * | 10/1998 | Elgamal et al. | 713/151 |
| 5,923,756 | A | * | 7/1999 | Shambroom | 713/156 |
| 6,088,451 | A | * | 7/2000 | He et al. | 726/8 |
| 6,377,691 | B1 | * | 4/2002 | Swift et al. | 380/277 |
| 6,738,749 | B1 | * | 5/2004 | Chasko | 705/17 |
| 6,940,980 | B2 | * | 9/2005 | Sandhu et al. | 380/282 |
| 2001/0007127 | A1 | * | 7/2001 | Staring | 713/160 |
| 2003/0061493 | A1 | * | 3/2003 | Angelo et al. | 713/189 |
| 2004/0063499 | A1 | * | 4/2004 | Schneider et al. | 463/42 |

* cited by examiner

*Primary Examiner*—Emmanuel L. Moise
*Assistant Examiner*—Minh Dieu Nguyen
(74) *Attorney, Agent, or Firm*—Ormiston & McKinney, PLLC (57) ABSTRACT

A system and method for secure network communication. In various embodiments of the present invention, data needed for authentication an encryption is included in each communication pass between network devices, so that when a network connection is broken, a secure connection can be reestablished with the next pass. A client authentication service on the client receives a server request and searches for a current client-side session key. If one is not present, the client authentication service generates and encrypts an initial session key, acquires credentials, adds the credentials to the server request, and encrypts the server request with the initial session key. The encrypted server request and the encrypted session key are sent to the server, where a server authentication service decrypts the initial session key, decrypts the server request with the initial session key, and authenticates the credentials before allowing the server request to be acted upon. Where a current client-side session key is detected, the client authentication service acquires the current client-side session key, generates a next step session key, adds the next step session key to the server request, and encrypts the server request with the current client-side session key. The encrypted server request is sent to the server where the server authentication service decrypts the server request with a current server-side session key allowing the server request to be acted upon.

22 Claims, 10 Drawing Sheets

ONE PASS SECURITY

CROSS REFERENCE TO RELATED APPLICATIONS

This Application claims the priority of provisional application 60/353,354 filed Oct. 22, 2001.

FIELD OF THE INVENTION

This invention relates generally to securing network communication. More specifically, this invention is directed to one-pass authentication and encryption enabling secure network communication.

BACKGROUND OF THE INVENTION

With the advent of the Internet, electronic business and financial transactions have flourished. Virtual private networks now enable people to conduct business from anywhere in the world, at least anywhere an Internet connection is available. With cellular and satellite communication technology, Internet connections are available virtually everywhere. Network communication protocols, such as S-HTTP (Secure Hypertext Transport Protocol) and SSL (Secure Socket Layer), have been developed to enable secure communication links between two network devices. These technologies provide security in two forms—authentication and encryption. Authentication is important to verify that each device is who it claims to be. Encryption allows the devices to exchange data rendering that data useless to a third party. The security provides confidence in transmitting private financial, business, and personal data over a computer network.

In addition to desktop computers, workstations, and servers, modern computing environments often include lightweight handheld computing devices that fit into a pocket, purse, or briefcase. To enable true mobility for these devices, wireless network communication is required. Wireless network interface cards enable network communication within a particular geographic area such as an office complex. The mobile device must remain within range of a server to communicate. Cellular modems and Internet ready cellular telephones enable network communication between devices located most anywhere.

Figure 1:
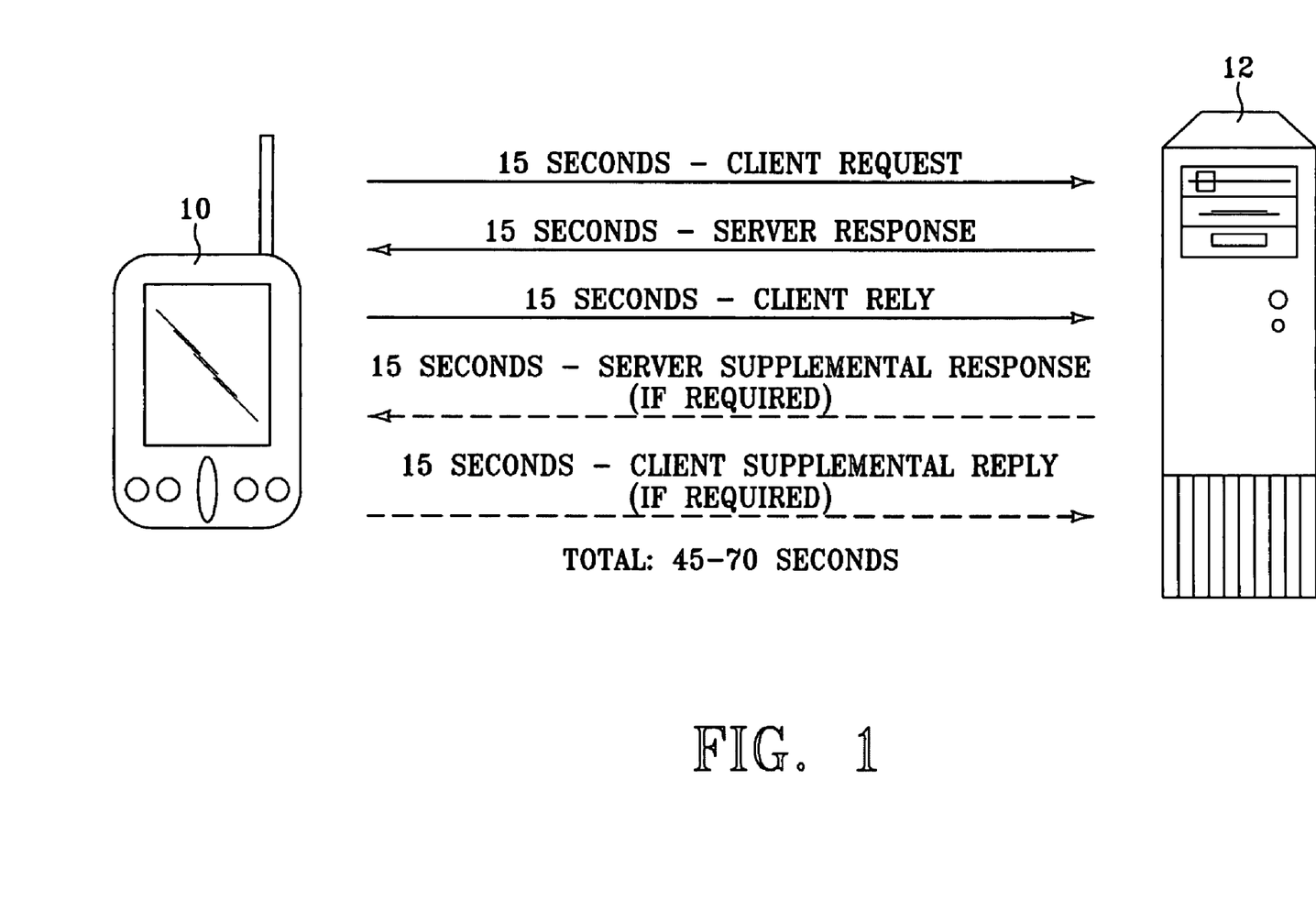
FIG. 1 is a schematic representation of a mobile computing environment illustrating a multi-pass handshake.

Existing secure network communication protocols such as SSL require a series of communications between two devices to establish a secure communication link between the devices. These communications are often referred to as a "handshake." A handshake allows the network devices to authenticate one another while exchanging data needed to encrypt future communications. FIG. 1 illustrates a typical handshake between a cellular enabled PDA (Personal Digital Assistant) 10 and a server 12. PDA 10 initiates the handshake communicating data to server 12. Server 12 responds sending data to PDA 10. Each communication can be referred to as a "pass." Existing protocols require several passes to establish a secure connection. For example, one version of an SSL handshake requires the following steps:

PDA 10 initiates communication requesting a digital certificate from server 12. A digital certificate includes a public key used to encrypt a reply as well as electronic data used to authenticate server 12.

Server 12 returns its certificate and requests a digital certificate from PDA 10.

With the server's certificate, PDA 10 authenticates server 12 and returns its own certificate. With the PDA's certificate, server 12 authenticates PDA 10.

PDA 10 then generates a symmetric encryption key. Using the public key from the server's certificate, PDA 10 encrypts the symmetric encryption key and then sends it to server 12. Using its own private key, server 12 decrypts the symmetric encryption key.

The handshake is complete. PDA 10 and server 12 have been authenticated. Future communications between PDA 10 and server 12 are encrypted and decrypted using the symmetric encryption key. For example, PDA 10 can generate a request for server (server request) to return data relating to a bank account for instance. PDA 10 encrypts the server request with the symmetric encryption key and sends it to server 12. Server 12 decrypts the server requests and generates a response to the server request (client response). Server 12 then encrypts the client response with the symmetric encryption key and returns it to PDA 12 which decrypts and displays the client response. Whenever the network connection between PDA 10 and server 12 is broken, the handshake must be repeated in order to authenticate the devices. When communicating over a cellular connection, each pass of a handshake requires approximately fifteen seconds. Consequently, a handshake typically requires anywhere from forty-five to seventy seconds, before a secure connection can be established or reestablished.

Wireless network connections can be unreliable. They are often broken requiring a secure connection to be frequently reestablished. The resulting delay of forty-five to seventy seconds required for each handshake renders secure cellular network communication annoying if not inefficient or unworkable. What is needed is a more efficient method for establishing and secure network communication that eliminates the need for a handshake as described above each time the connection is broken.

SUMMARY OF THE INVENTION

The present invention is directed to authentication and encryption for secure network communication. In various embodiments of the present invention, data needed for authentication an encryption is included in each communication pass between network devices, so that when a network connection is broken, a secure connection can be reestablished with the next pass. A client authentication service on the client receives a server request and searches for a current client-side session key. If one is not present, the client authentication service generates and encrypts an initial session key, acquires credentials, adds the credentials to the server request, and encrypts the server request with the initial session key. The encrypted server request and the encrypted session key are sent to the server, where a server authentication service decrypts the initial session key, decrypts the server request with the initial session key, and authenticates the credentials before allowing the server request to be acted upon. Where a current client-side session key is detected, the client authentication service acquires the current client-side session key, generates a next step session key, adds the next step session key to the server request, and encrypts the server request with the current client-side session key. The encrypted server request is sent to the server where the server authentication service decrypts the server request with a current server-side session key allowing the server request to be acted upon.

DETAILED DESCRIPTION OF THE INVENTION

INTRODUCTION: Traditional security protocols, such as SSL and S-HTTP, require a handshake to establish a secure network connection. For the connection to remain secure, the connection cannot be broken. When broken, the handshake must be repeated to reestablish a secure connection. In a wireless network, a handshake is a relatively slow process. Establishing and then continually reestablishing secure connection on a wireless network renders the network communication inefficient if not, in some cases, unworkable.

It is expected that various embodiments of the present invention will enable users to establish and reestablish a secure network communication session with a single pass. Network security is established with each application level request that a client makes on a server and with each application level response that the server returns to the client. Consequently, as may often be the case, the network connection between the client and the server can be broken between each server request, client response, and subsequent server request without negatively affecting the communication speed between the client and the server.

Figure 2:
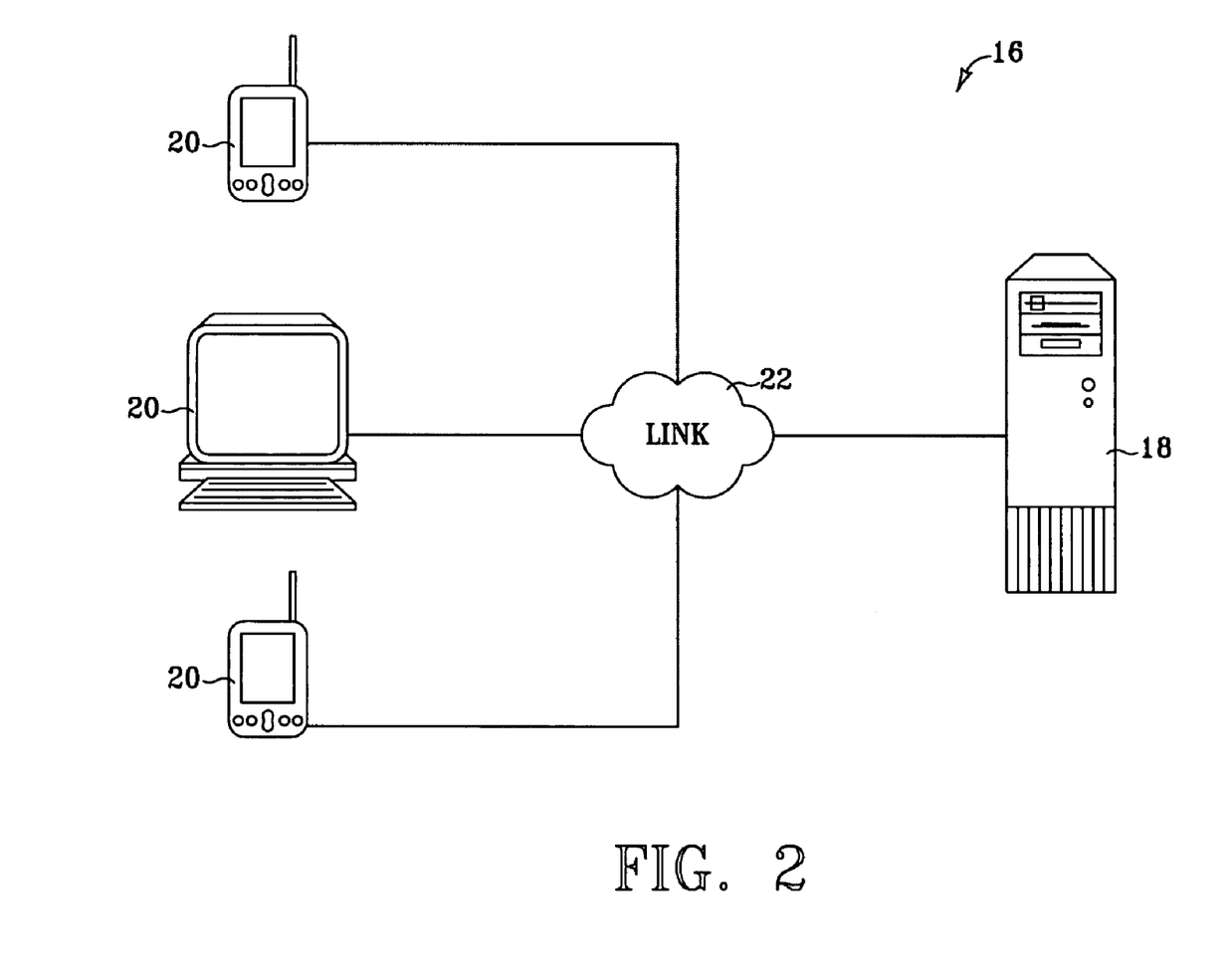
FIG. 2 is a schematic representation of a mobile computing environment in which various embodiment of the present invention may be incorporated.

COMPONENTS: FIG. 2 illustrates a computing environment 16 in which various embodiments of the present invention may be incorporated. Embodiments of the present invention, however, may be incorporated in any environment in which it is desirable or necessary to establish secure network communication. Environment 16 includes server device 18, client devices 20, and link 22, interconnecting client device 18 with client devices 22. Server device 18 represent generally any computing device capable of serving electronic data over link 22. Client devices 20 represent generally any computing device capable of communicating with server device 18 over link 22. Link 22 represents generally any cable, wireless, or remote connection via a telecommunication link, an infrared link, a radio frequency link, cellular link, or any other connector or system that provides electronic communication between the devices. Link 22 may represent, in part, an intranet, the Internet, or a combination of both.

Figure 3:
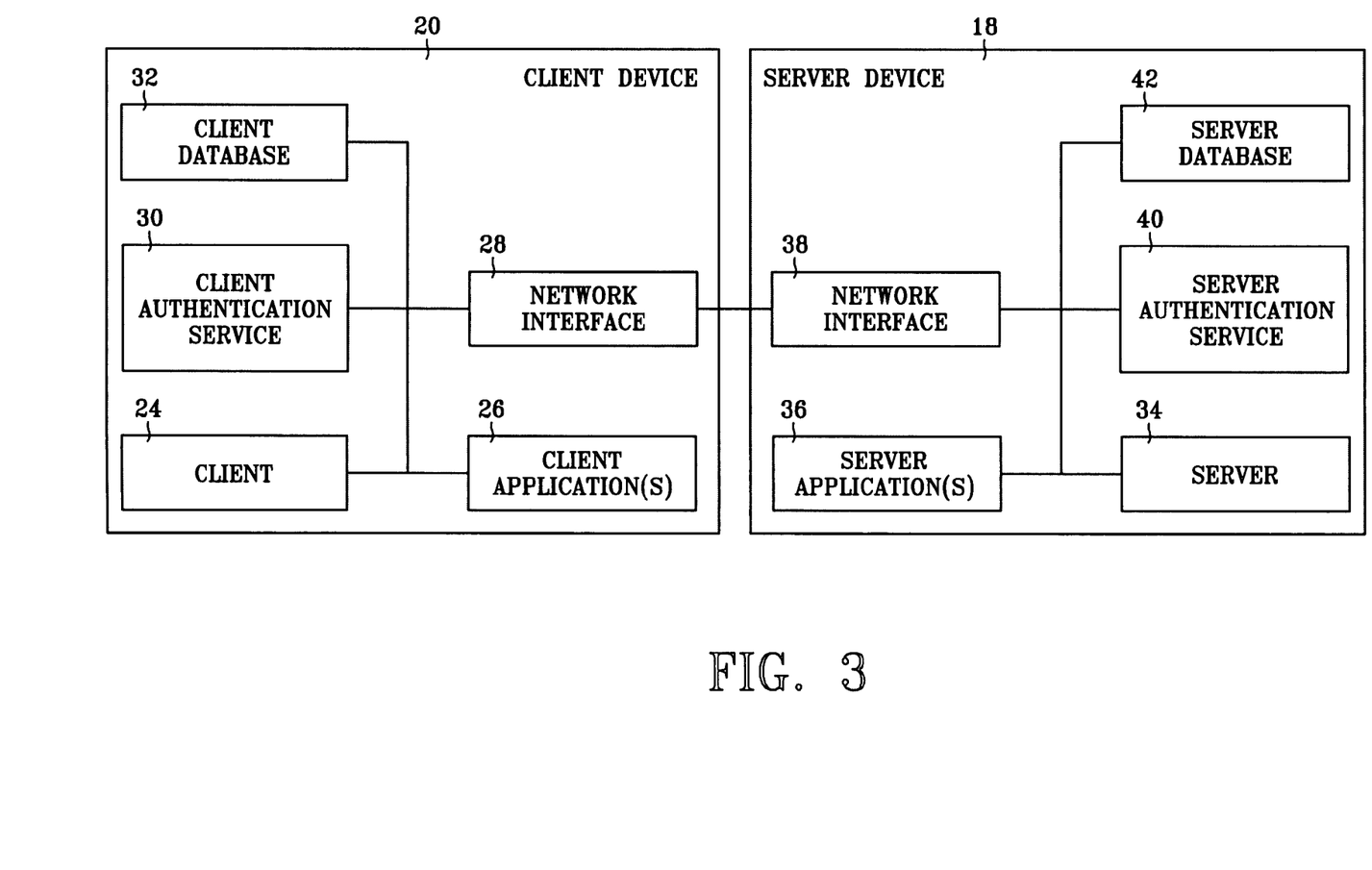
FIG. 3 is schematic representation of the components of the client and server devices of FIG. 2 according to one embodiment of the present invention.

FIG. 3 illustrates the components of server device 18 and a single client device 20 used to establish a secure network communication link between the devices. Client device 20 includes client 24, client application 26, network interface 28, client authentication service 30, and client database 32. Client 24 represents any programming capable of generating and sending a server request. A server request is electronic data formed to instruct a server to perform a particular task. When that task involves instructing the server to return electronic data, the return of that data can be referred to as a client response. However, a server request may, in some cases, only instruct a server to perform a particular task without returning electronic data to the client. Client application 26 represents any programming capable of providing client 24 with electronic data used to generate the server request. Client 24 and client application 26 may, in the case of a web browser, be incorporated in a single application. Network interface 28 represents any combination of hardware and/or programming capable of transmitting and receiving electronic data over link 22. Network interface 28 may be a standard network interface card, a wireless network interface card, a wireless or cellular modem, or an Internet ready Cellular telephone. Client authentication service 30 represents programming capable of adding electronic information to and encrypting a server request as well as decrypting a client response. Client database 32 represents any readable and writeable memory used to hold electronic data used by client authentication service 30.

Server device 18 includes server 34, server application 36, network interface 38, server authentication service 40, and server database 42. Server 34 represents generally any programming capable of receiving and acting on a server request as well as generating a client response. Server application 36 represents programming used by server 34 to act on a server request and to generate a client response. For example, server application 34 may be a program interface enabling server 32 to retrieve and manipulate information in a database located on server device 18 or elsewhere. Network interface 38 like network interface 28 represents any combination of hardware and/or programming capable of transmitting and receiving electronic data over link 22. Server authentication service 40 represents generally any programming capable of decrypting a server request as well as adding information to and encrypting a client response. Server database 42 represents any readable and writeable memory used to hold electronic data used by server authentication service 40.

Figure 4:
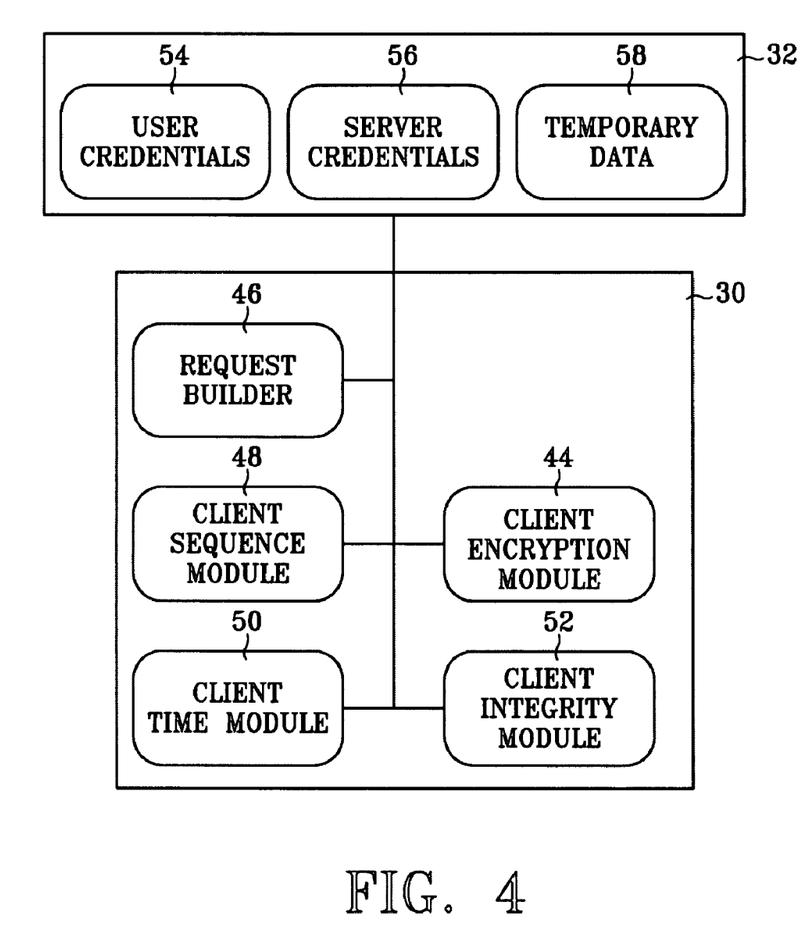
FIG. 4 is a schematic representation of the client authentication service and client database of FIG. 3.

As illustrated in FIG. 4, client authentication service 30 includes client encryption module 44, request builder 46, client sequence module 48, client time module 50, and client integrity module 52. Client encryption module 44 represents any programming capable of generating symmetric encryption keys, encrypting server requests, and decrypting client responses. Request builder 46 represents any programming capable of adding electronic data to a server request, encrypted or not, to be sent by client 24 to server 34. Client sequence module 48 represents programming capable of generating and updating a session counter to be added to a server request by request builder 46. The term session represents a period of communication between client device 20 and server device 18 used to perform a particular task or tasks. A session does not require a constant network connection. An incrementally increased session counter is added to each subsequent server request during the session to ensure that a single server request is not acted upon twice by server device 18. For example, the first session counter for a session may have a value of zero, the second—a value of one, and so on. Client time module 50 represents any programming capable of generating a time stamp for request builder 46 to add to a server request as well as validating a time stamp obtained from a client response. In some instances it may be desirable to break a secure communication link between server and client devices 18 and 20 where time between server requests or client responses exceeds a specified limit. Time stamps enable tracking of the time elapsed between server requests and/or server responses.

Client integrity module 52 represents programming capable of generating integrity data such as a checksum for request builder 46 to add to a server request as well as verifying the integrity of a client response. When communicating through a secure network link, it can be important to verify that the data making up a server request or a client response has not been intercepted and altered since the request or response was sent. A checksum is a numerical value calculated, at least in part, by the number of bits that comprise an electronic message such as a server request or client response. Upon receipt of the electronic message, if the number of bits does not match the checksum, the receiver of the message, in this case server device 18, can assume that the message contains errors or has been tampered with.

Still referring to FIG. 4, client database 32 contains user credentials 54, server credentials 56, and client temporary data 58. User credentials 54 represent electronic data identifying and unique to a particular user of client device 20 or unique to client device 20 itself. It is expected that user credentials will be a username and password pair. Server credentials 56 represent electronic data used to encrypt data that can then only be decrypted by server device 18. It is expected that server credentials will include an asymmetric public encryption key, referred to herein as a server public key. Client temporary data 58 includes the most recently generated session counter, a time stamp obtained from the most recent client response, and electronic data used by client encryption module 44 to encrypt server requests and to decrypt client responses. It is expected that this electronic data will include a symmetric encryption key, referred to herein as a current client-side session key, that is periodically updated during a session.

Figure 5:
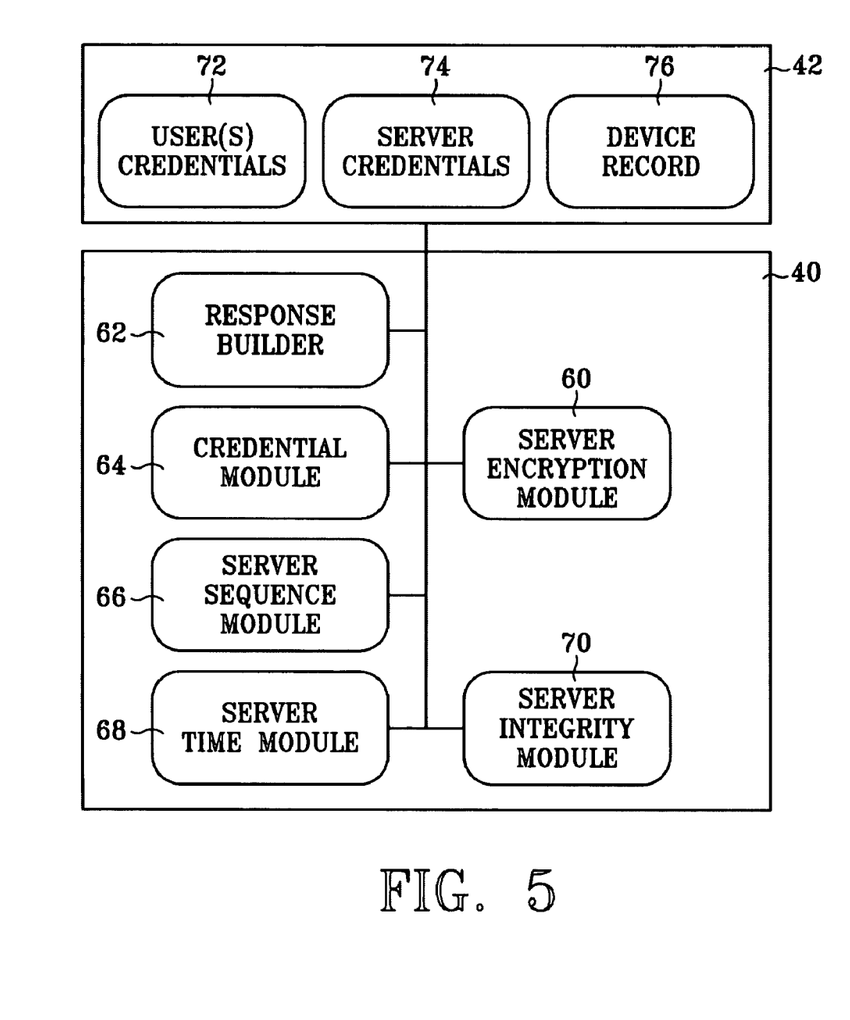
FIG. 5 is a schematic representation of the server authentication service and server database of FIG. 3.

Referring now to FIG. 5, server authentication service 40 includes server encryption module 60, response builder 62, credential module 64, server sequence module 66, server time module 68 and server integrity module 70. Server encryption module 60 represents any programming capable of generating symmetric encryption keys, encrypting client responses and decrypting server requests. Response builder 62 represents any programming capable of adding electronic data to a client response, encrypted or not, to be sent by server 34 to client 24. Credential module 64 represents any programming capable of authenticating credentials acquired from a decrypted server request as well as identifying data in server database 42 associated with credentials obtained from a server request.

Server sequence module 66 represents programming capable of storing a session counter obtained from a server request and comparing that session counter with the session counter received and stored following a previous server request. Server sequence module 66 can then compare the stored session counter with a new session counter obtained from the subsequent server request. If the new session counter does not exceed the stored session counter, the subsequent server request is to be ignored.

Server time module 68 represents programming capable of generating a time stamp for response builder 62 to add to a client response as well as validating a time stamp obtained from a server request. Server integrity module 70 represents programming capable of generating integrity data such as a checksum for response builder 62 to add to a client response as well verifying the integrity of a server request.

Still referring to FIG. 5, server database 42 includes user credentials 72, server credentials 74, and device record 76. User credentials 72 contain electronic data, typically in the form of verified user name and password pairs used by credential module 64 to authenticate credentials obtained from a server request. Server credentials 74 contain data used by server encryption module 60 to decrypt data used to encrypt a server request. It is expected that this data will include an asymmetric private encryption key, referred to herein as a server private key. Device record 76 represents electronic data used by server encryption module 60, server sequence module 66, and server time module 68 and used to establish secure network communication with client device 20. Server database 42 may include other device records to store data for securely communicating with devices other then client device 20. It is expected that this electronic data will include a session key that is periodically changed during a given session as well as a session counter and time stamp for the most recent server request.

The block diagrams of FIGS. 2-5 show the architecture and functionality of one implementation of the present invention. If embodied in software, each block may represent a module, segment, or portion of code that comprises one or more executable instructions to implement the specified logical function(s). If embodied in hardware, each block may represent a circuit or a number of interconnected circuits to implement the specified logical function(s).

Also, the present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain electronic instructions for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Figure 6:
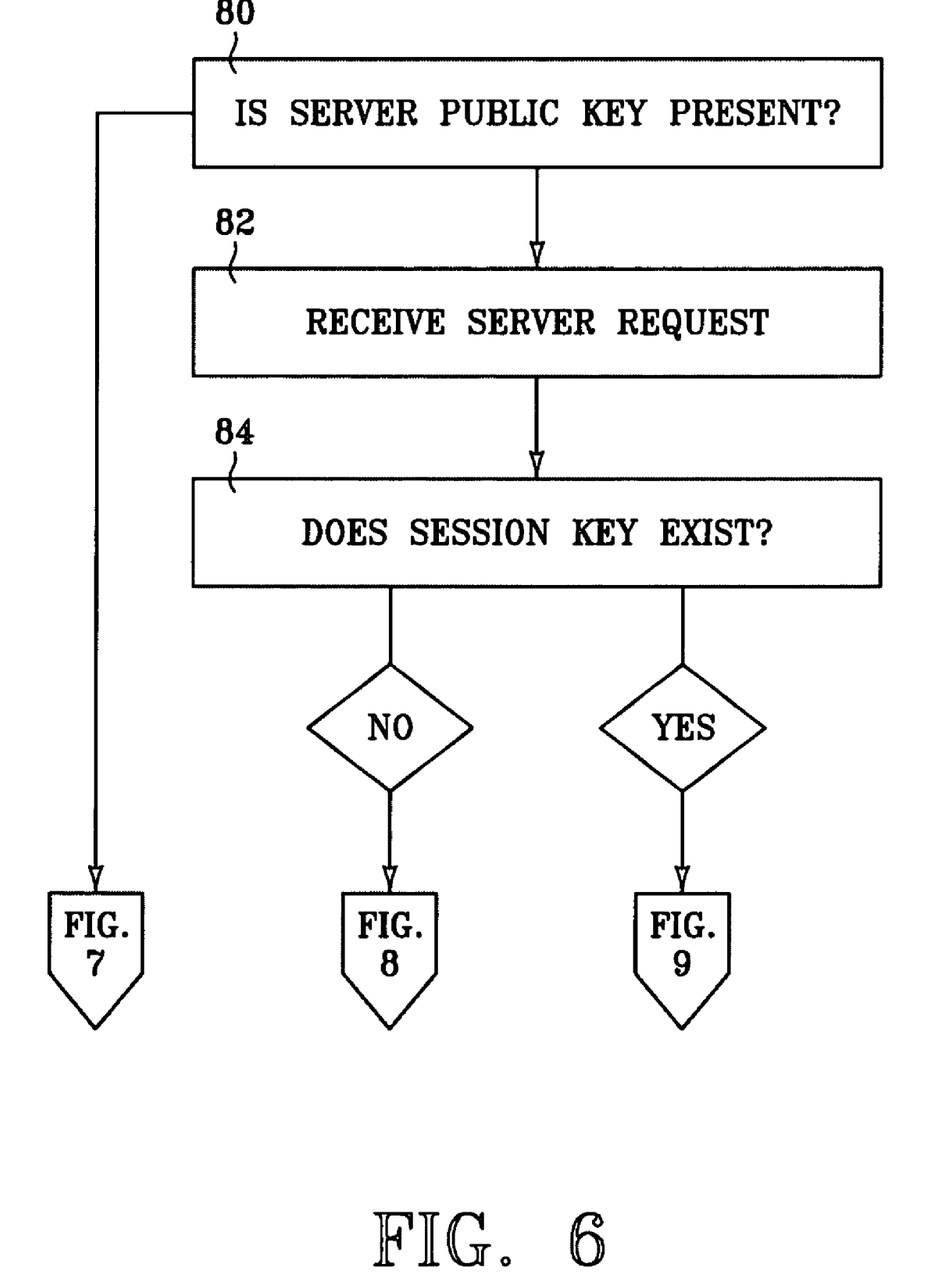
FIGS. 6, 7, 8, 9A, and 9B are interrelated flow diagrams illustrating steps followed during an authentication process according to one embodiment of the present invention.
Figure 7:
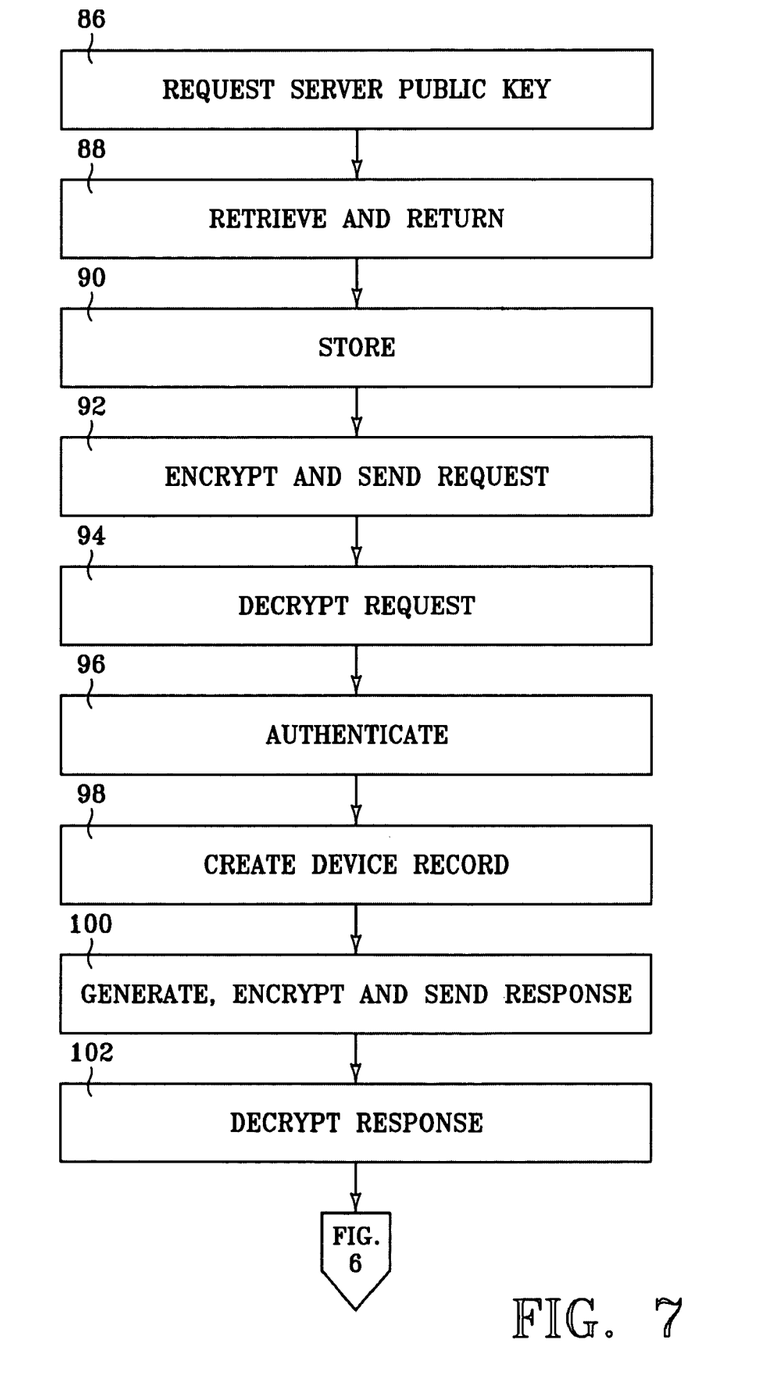
Figure 8:
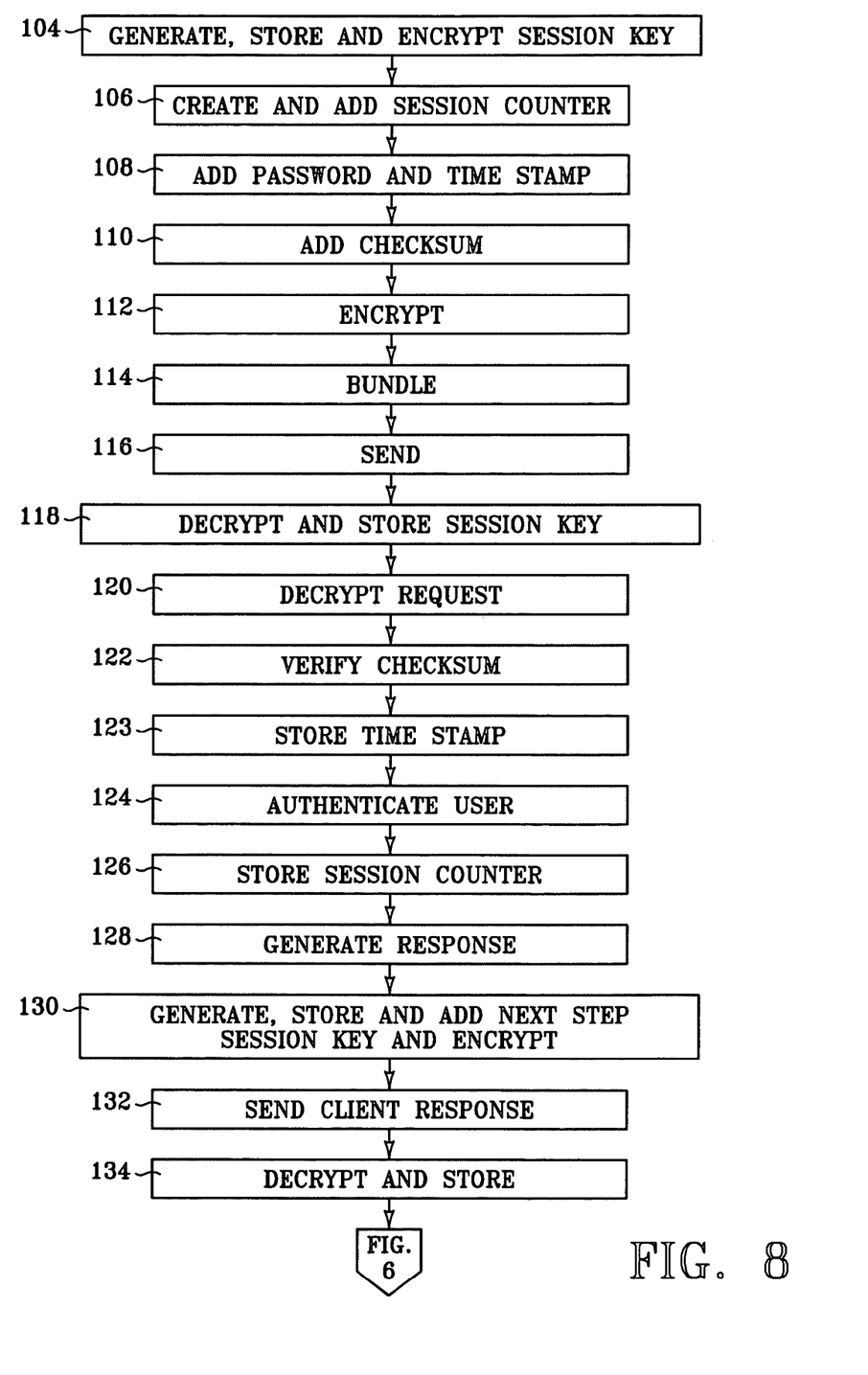
Figures 9, 9A:
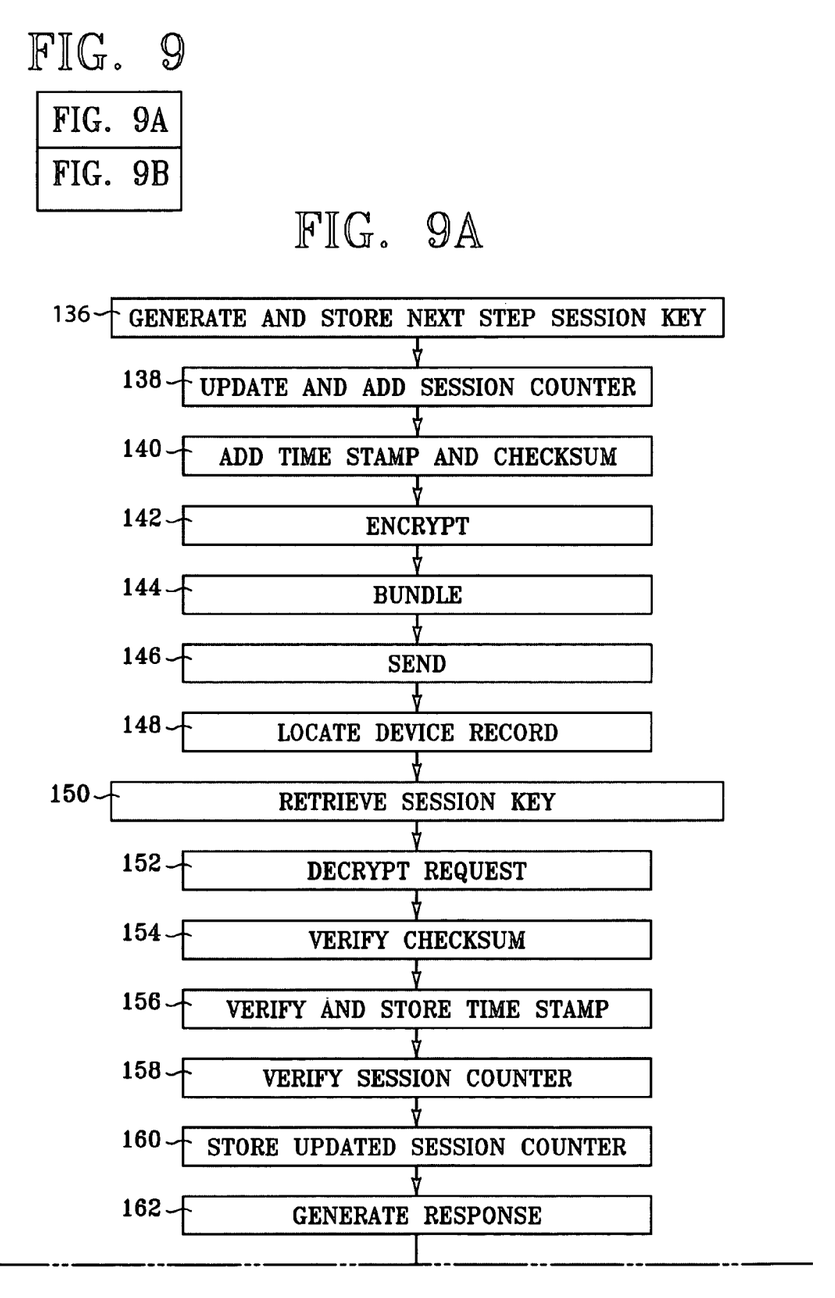
Figure 9B:
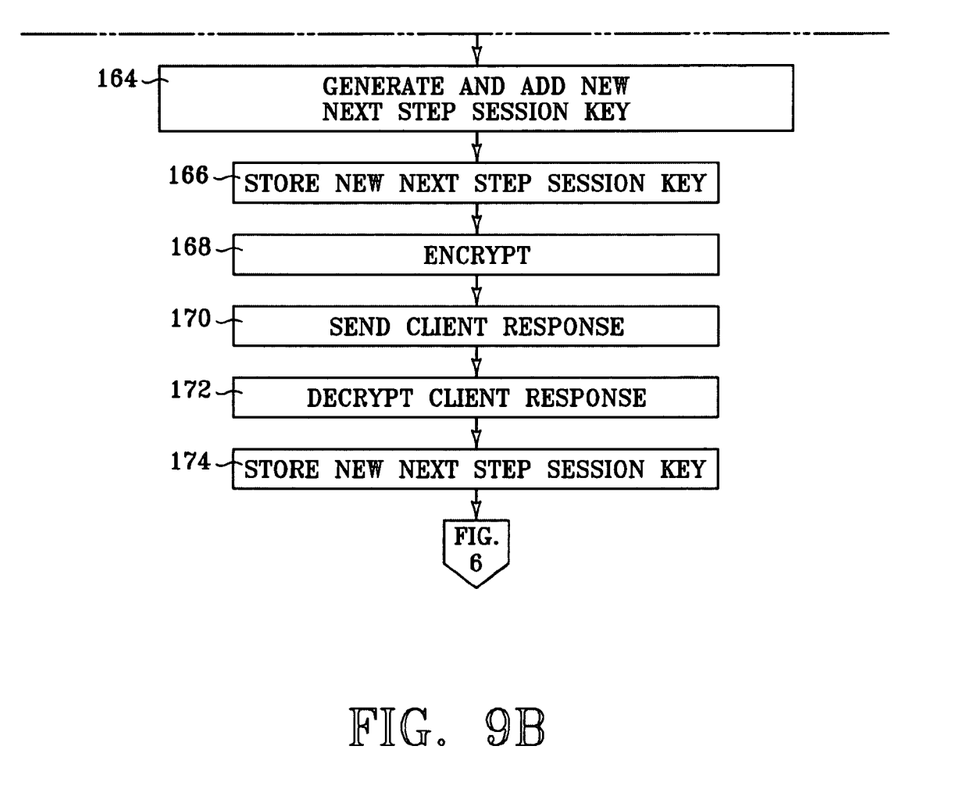

OPERATION: The flow diagrams of FIGS. 6, 7, 8, 9A and 9B illustrate steps taken to authenticate network communication according to one embodiment of the present invention. The single pass security model according to the present invention can be broken into three interrelated branches. The first branch, typically used once, involves the client obtaining the server's public encryption key and establishing a device record. The second branch involves establishing a secure communication session between the client and the server while the third branch involves continuing the secure communication session established between the client and the server. FIG. 6 illustrates a set of initial steps taken interrelating the three branches. FIG. 7 illustrates the first branch in which steps taken to initialize a client device 20 for secure network communication. FIG. 8 Illustrates the second branch in which steps taken to start a secure communication session, while FIGS. 9A and 9B illustrates the third branch in which steps taken to continue an existing secure communication session.

Referring first to FIG. 6, client authentication service 30 determines whether a server public key is present in client database 32 (step 80). If not the process continues with the steps illustrated in FIG. 7 to acquire a server public key and to establish device record 76 in server database 42 on server device 20. Device record 76 provides server authentication service 40 with a location in server database 42 to store data relating to client device 20. If a server public key is present, client 24 waits for a server request. Upon receipt of a server request (step 82), client authentication service 30 determines if a current session key exists in client database 32 (step 84). Throughout the remainder of the description, a current session key present in client database 30 will be referred to as a current client-side session key. If one does not exist, the process continues in FIG. 8. If a current client-side session key does exist, the process continues in FIGS. 9A and 9B.

Referring to FIG. 7, client authentication service 30 directs client 24 to send data to server 34 requesting a server public key (step 86). Server 34 receives the request, retrieves the server public key from server database 42 and returns the public key to client 24 (step 88). Client authentication service 30 stores the server public key in client database 32 (step 90) and then directs client 24 to generate and send a server request to establish a device record and obtain, if desired, to return security information. Before sending, client authentication service 40 adds user credentials to the server request, generates and adds a session key to the server request, and encrypts the server request with the server public key (step 92). The requested security information may include data such as asymmetric public and private encryption keys generated for client device 20. Client authentication service 30 stores the session key in client database 32 to be used to decrypt a client response to the server request.

Server 34 receives the request, and server authentication service 40 decrypts the server request using the server private key (step 94). Obtaining the credentials from the decrypted server request, server authentication service 40 authenticates the credentials finding matching verified credentials located in server database 42 (step 96). If the credentials cannot be authenticated, the server request is ignored or server 34 sends a client response challenging client 24 to provide new credentials. Server authentication service 40 creates device record 76 in server database 42 (step 98). This may be accomplished by generating a device identifier, that is a code unique to client device 20 and creating a record in server database 42 accessible using the device identifier. Alternatively, server authentication service 40 may create a record (device record 76) accessible using the credentials obtained from the server request.

Server authentication service 40 instructs server 34 to generate and send a client response that includes the device identifier and may include data such as an asymmetric public and private key pair generated for client device 20 (step 100). Server authentication service 40 encrypts the client response with the session key provided in the server request (step 100). Client 24 receives the client response, and client authentication service 30 decrypts the client response and stores data from the response in client database 32 (step 102). The process then repeats in FIG. 6.

Referring now to FIG. 8, upon receipt of a server request and after not finding a current client-side session key in client database 32 in steps 82 and 84, client authentication service 30 generates an initial session key, storing the initial session key in client database 43 and encrypting the initial session key with the server public key (step 104). Client authentication service 30 creates and adds a session counter to the server request (step 106), also adding the password, a time stamp, and a checksum to the server request (steps 108 and 110). Client authentication service encrypts the server request with the initial session key (step 112). Client 24 bundles the encrypted initial session key with the encrypted server request and the device identifier (step 114) and sends the bundle to server 34 (step 116).

Upon receipt by server 34, server authentication service 40 decrypts the initial session key with the server private key, locates device record 76 with the device identifier, and stores the initial session key in device record 76 for client device 20 in server database 42 (step 118). Server authentication service then decrypts the server request with the initial session key (step 120), verifies the integrity of the request with the included checksum (step 122), and stores the time stamp in device record 76 (step 123). With the user credentials added to the server request, server authentication service authenticates the user finding matching verified credentials in server database 42 (step 124). Where the integrity cannot be verified or the user cannot be authenticated, the server request may be ignored or the server authentication device may instruct server 34 to challenge client 24 to resend the server request and/or provide new credentials.

Server authentication service 40 stores the session counter in device record 76 in server database 42 (step 126). Server 34 and server application 36 act on the server request, and if required, generate a client response (step 128). Server authentication service 40 generates a next step session key, adds it to the client response, and then encrypts the client response with the initial session key, and saves the next step session key in device record 76 to be used as a current server-side session key used to decrypt a subsequent server request (step 130). Server 34 sends the client response to client 24 (step 132). Client authentication service 30 decrypts the client response with the initial session key and stores the next step session key in client database 32 to be used as a current client-side session key to encrypt a subsequent server request (step 134). The process then repeats in FIG. 6.

Referring now to FIGS. 9A and 9B, upon receipt of a server request and after finding a current client-side session key in client database 32 in steps 82 and 84, client authentication service 30 generates a next step session key, storing the key in client database 32 and adding it to the server request (step 136). Client authentication service 30 updates the session counter adding the updated session counter (step 138), a time stamp, and a checksum to the server request (step 140). Client authentication service 30 encrypts the server request with the current client-side session key (step 142). Client 24 bundles the encrypted server request with the device identifier (step 144) and sends the bundle to server 34 (step 146). The device identifier, may but need not be encrypted.

Server 34 receives the server request and device identifier, and server authentication service 40 locates device record 76 for client device 20 using the device identifier (step 148). Server authentication service 40 retrieves the current server-side session key from device record 76 (step 150), decrypts the server request (step 152), verifies integrity of the server request with the checksum (step 154), the time stamp (step 156), and the session counter (step 158). If the server request cannot be decrypted or the checksum or the session counter cannot be verified, the server request may be ignored or server 35 may challenge client 24 to resend the server request. Where the time stamp cannot be verified, the process continues in FIG. 8. Server authentication service 40 saves the session counter in device record 76 for client device 18 replacing the prior session counter (step 160).

Server 34 and server application 36 act on the server request, and if required generate a client response (step 162). Server authentication service 40 generates a new next step session key, adds it to the client response (step 164). Server authentication service 40 saves the new next-step session key in device record 76 for client device 20, the new key to be used as a current server-side session key to decrypt a subsequent server request (step 166). Server authentication service 40 then encrypts the client response using the next step session key provided with the server request (step 168), and server 34 sends the client response to client 24 (step 170). Client authentication service 30 decrypts the client response with the next step session key sent with the server request (step 172) and stores the new next step session key provided with the client response in client database 32 to be used as a current client-side session key used to encrypt a subsequent server request (step 174). The process then repeats in FIG. 6.

Although the flow diagrams charts of FIGS. 6, 7, 8, 9A, and 9B show a specific order of execution, the order of execution may differ from that which is depicted. For example, the order of execution of two or more blocks may be scrambled relative to the order shown. Also, two or more blocks shown in succession in FIGS. 6, 7, 8, 9A, and 9B may be executed concurrently or with partial concurrence. All such variations are within the scope of the present invention. The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for secure network communication during an existing session, comprising the acts of:
   receiving a server request;
   acquiring a current client-side session key;
   generating and adding a next step session key to the server request;
   updating a session counter;
   adding the updated session counter to the server request;
   encrypting the server request with the current client-side session key, the encrypted server request including the added current client-side session key and the added undated session counter;
   sending the encrypted server request; the sent encrypted server request including the added current client-side session key and the added updated session counter;
   storing the next step session key to be used as a current client-side session key used to encrypt the subsequent server request;
   acquiring a current server-side session key;
   decrypting the server request with the current server-side session key;
   comparing the updated session counter with a last stored session counter; and
   acting on the server request only if the updated session counter exceeds the last stored session counter.

2. The method of claim 1, further comprising the acts of:
   generating a checksum;
   adding the checksum to the server request before encrypting the server request; and
   after decrypting, verifying the checksum prior to acting on the server request.

3. The method of claim 1, further comprising adding a device identifier to the server request before sending, and wherein the act of acquiring the current server-side session key comprises utilizing the device identifier to acquire the current server-side session key.

4. The method of claim 3, further comprising, after decrypting the server request, storing the next step session key such that it is accessible using the device identifier, the next step session key to act as a current server-side session key used to decrypt a subsequent server request.

5. The method of claim 1, wherein the act of acting on the server request comprises:
   generating a client response;
   generating a new next step session key and adding the new next step session key to the client response;
   storing the new next step session key to be used as a current server-side session key to decrypt a subsequent server request;
   encrypting the client response with the next step session key sent with the server request;
   sending the client response;
   decrypting the client response with the next step session key sent with the server request; and
   storing the new next step session key to be used as a current client-side session key to encrypt the subsequent server request.

6. A method for secure network communication, comprising
   receiving a server request;
   detecting a presence of a current client-side session key;
   if a current client-side session key is not detected, generating and encrypting an initial session key, acquiring credentials, adding the credentials to the server request, generating a session counter and adding the session counter to the server request, encrypting the server request with the initial session key so that the encrypted server request includes the added credentials and session counter, sending the encrypted server request and the encrypted initial session key to a server, such that the sent encrypted server request includes the added credentials and session counter, decrypting the initial session key, decrypting the server request with the initial session key such that the decrypted server request includes the added credentials and the session counter, storing the session counter for use in future network communications, and authenticating the credentials, and acting on the server request;
   if a current client-side session key is detected, acquiring the current client-side session key, generating a next step session key, adding the next step session key to the server request, updating the session counter, adding the updated session counter to the server request, and encrypting the server request with the current client-side session key, the encrypted server request including the added next step session key and the added undated session counter, sending the encrypted server request, the sent encrypted server request including the added next step session key and the added undated session counter, and decrypting the server request with a current server-side session key, the decrypted server request including the added next step session key and the added undated session counter, comparing the updated session counter with a last stored session counter, and acting on the server request if the updated session counter exceeds the last stored session counter.

7. The method of claim 6, further comprising the acts of:
   generating a checksum;
   adding the checksum to the server request before encrypting the server request whether or not a current client-side session key is detected; and
   verifying the checksum prior to acting on the server request.

8. The method of claim 6, wherein the act of acquiring credentials comprises acquiring a username and a password, and wherein the act of authenticating the credentials comprises authenticating the username and the password.

9. The method of claim 6, further comprising, where a current client-side session key is detected, adding a device identifier to the server request, and wherein the act of acquiring the current server-side session key comprises utilizing the device identifier to acquire the current server-side session key.

10. The method of claim 6, wherein the act of acting on the server request comprises:
generating a client response;
where a current client-side session key is detected, generating a next step session key, adding the next step session key to the response, and encrypting the client response with the initial session key;
where current a client-side session key is not detected, generating a new next step session key, adding the new next step session key to the client response, and encrypting the client response with the next step session key sent with the server request;
storing the generated next step session key, new or not, to be used as a current server-side session key to decrypt a subsequent server request; and
sending the encrypted client response.

11. The method of claim 10, further comprising the acts of
where a current client-side session key is not detected, decrypting the server response with the initial session key and storing the next step session key to be uses as a current client-side session key to encrypt a subsequent server request; and
where a current client-side session key is detected, decrypting the server response with the next step session key sent with the session request and storing the new next step session key to be used as a current client-side session key to encrypt a subsequent server request.

12. A computer program product for secure network communication during an existing session, the product comprising computer useable medium having computer executable instructions thereon for:
receiving a server request;
acquiring a current client-side session key;
generating and adding a next step session key to the server request;
updating a session counter;
adding the updated session counter to the server request;
encrypting the server request with the current client-side session key, the encrypted server request including the added current client-side session key and the added updated session counter;
sending the encrypted server request; the sent encrypted server request including the added current client-side session key and the added updated session counter;
storing the next step session key to be used as a current client-side session key used to encrypt the subsequent server request;
acquiring a current server-side session key;
decrypting the server request with the current server-side session key;
comparing the updated session counter with a last stored session counter; and
acting on the server request only if the updated session counter exceeds the last stored session counter.

13. The product of claim 12, further comprising instructions for:
generating a checksum;
adding the checksum to the server request before encrypting the server request; and
after decrypting, verifying the checksum prior to acting on the server request.

14. The product of claim 12, further comprising instructions for adding a device identifier to the server request before sending, and wherein the act of acquiring the current server-side session key comprises utilizing the device identifier to acquire the current server-side session key.

15. The product of claim 14, further comprising instructions for, after decrypting the server request, storing the next step session key such that it is accessible using the device identifier, the next step session key to act as a current server-side session key used to decrypt a subsequent server request.

16. The product of claim 12, wherein the instructions for acting on the server request comprise instructions for:
generating a client response;
generating a new next step session key and adding the new next step session key to the client response;
storing the new next step session key to be used as a current server-side session key to decrypt a subsequent server request;
encrypting the client response with the next step session key sent with the server request;
sending the client response;
decrypting the client response with the next step session key sent with the server request; and
storing the new next step session key to be used as a current client-side session key to encrypt the subsequent server request.

17. A computer program product for secure network communication, the product comprising computer useable medium having computer executable instructions thereon for:
receiving a server request;
detecting a presence of a current client-side session key;
if a current client-side session key is not detected, generating and encrypting an initial session key, acquiring credentials, adding the credentials to the server request, generating a session counter and adding the session counter to the server request, encrypting the server request with the initial session key so that the encrypted server request includes the added credentials and session counter, sending the encrypted server request and the encrypted initial session key to a server, such that the sent encrypted server request includes the added credentials and session counter, decrypting the initial session key, decrypting the server request with the initial session key such that the decrypted server request includes the added credentials and the session counter, storing the session counter for use in future network communications, and authenticating the credentials, and acting on the server request;
if a current client-side session key is detected, acquiring the current client-side session key, generating a next step session key, adding the next step session key to the server request, updating the session counter, adding the updated session counter to the server request, and encrypting the server request with the current client-side session key, the encrypted server request including the added next step session key and the added updated session counter, sending the encrypted server request, the sent encrypted server request including the added next step session key and the added updated session counter, and decrypting the server request with a current server-side session key, the decrypted server request including the added next step session key and the added undated session counter, comparing the updated session counter with a last stored session counter, and acting on the server request if the updated session counter exceeds the last stored session counter.

18. The product of claim 17, further comprising instructions for:
   generating a checksum;
   adding the checksum to the server request before encrypting the server request whether or not a current client-side session key is detected; and
   verifying the checksum prior to acting on the server request.

19. The product of claim 17, wherein the instructions for acquiring credentials comprise instructions for acquiring a username and a password, and wherein the instructions for authenticating the credentials comprise instructions for authenticating the username and the password.

20. The product of claim 17, further comprising, where a current client-side session key is detected, instructions for adding a device identifier to the server request, and wherein the instructions for acquiring the current server-side session key comprise instructions for utilizing the device identifier to acquire the current server-side session key.

21. The product of claim 17, wherein the instructions for acting on the server request comprise instructions for:
   generating a client response;
   where a current client-side session key is detected, generating a next step session key, adding the next step session key to the response, and encrypting the client response with the initial session key;
   where current a client-side session key is not detected, generating a new next step session key, adding the new next step session key to the client response, and encrypting the client response with the next step session key sent with the server request;
   storing the generated next step session key, new or not, to be used as a current server-side session key to decrypt a subsequent server request; and
   sending the encrypted client response.

22. The product of claim 21, further comprising instructions for:
   where a current client-side session key is not detected, decrypting the server response with the initial session key and storing the next step session key to be uses as a current client-side session key to encrypt a subsequent server request; and
   where a current client-side session key is detected, decrypting the server response with the next step session key sent with the server request and storing the new next step session key to be used as a current client-side session key to encrypt a subsequent server request.

\* \* \* \* \*